US011684206B2

(12) United States Patent
Crozier et al.

(10) Patent No.: US 11,684,206 B2
(45) Date of Patent: Jun. 27, 2023

(54) BEVERAGE PREPARATION DEVICE FOR VEHICLE (71) Applicant: SOCIETE DES PRODUITS NESTLE S.A., Vevey (CH)

(72) Inventors: Etienne Crozier, La Neuveville (CH); Adrien Hoffet, Prilly (CH); Marco Magatti, Lausanne (CH); Damien Romand, La Neuveville (CH); Jean-Luc Thuliez, Le Landeron (CH)

(73) Assignee: Societe des Produits Nestle S.A., Vevey (CH)

( * ) Notice: Subject to any disclaimer, the term of this patent is extended or adjusted under 35 U.S.C. 154(b) by 795 days.

(21) Appl. No.: 16/604,070

(22) PCT Filed: Apr. 9, 2018

(86) PCT No.: PCT/EP2018/058967
§ 371 (c)(1),
(2) Date: Oct. 9, 2019

(87) PCT Pub. No.: WO2018/189071
PCT Pub. Date: Oct. 18, 2018

(65) Prior Publication Data
US 2020/0154939 A1 May 21, 2020

(30) Foreign Application Priority Data
Apr. 11, 2017 (EP) .................................... 17165966

(51) Int. Cl.
*A47J 31/52* (2006.01)
*A47J 31/00* (2006.01)
*A47J 31/36* (2006.01)

(52) U.S. Cl.
CPC ........... *A47J 31/525* (2018.08); *A47J 31/005* (2013.01); *A47J 31/3676* (2013.01);
(Continued)

(58) Field of Classification Search
CPC .... A47J 31/525; A47J 31/005; A47J 31/5253; A47J 31/521; A47J 31/5255; A47J 31/3676
See application file for complete search history.

(56) References Cited

U.S. PATENT DOCUMENTS 4,151,790 A * 5/1979 Spirk ...................... A47J 31/56
219/202
8,515,574 B2 * 8/2013 Studor .................. A47J 31/521
705/16
(Continued)

FOREIGN PATENT DOCUMENTS

DE 102013207734 10/2014
DE 102013207730 11/2014
(Continued)

*Primary Examiner* — Michael Collins
(74) *Attorney, Agent, or Firm* — K&L Gates LLP (57) ABSTRACT

The invention relates to a device (1) for preparing a beverage, more particularly, for a vehicle comprising: —a brewing unit (2) for receiving a dose (3) of beverage ingredients, —a pressure pump (4) for supplying pressurized liquid to the brewing unit, —an electronic control unit (5) for selectively controlling the activation of the pressure pump, wherein the electronic control unit (5) is arranged to control the activation and deactivation of the pressure pump (4), by providing output to the pressure pump as response to input indicative of a determined inclination angle relative to horizontal and/or to a detected spatial displacement or acceleration; said input being received from inclination angle and/or displacement sensing means (6) which are part of and/or foreign to the device.

15 Claims, 6 Drawing Sheets

(52) U.S. Cl.
CPC .......... *A47J 31/521* (2018.08); *A47J 31/5253* (2018.08); *A47J 31/5255* (2018.08)

(56) References Cited

U.S. PATENT DOCUMENTS

| | | | |
|---|---|---|---|
| 10,470,606 B2 | 11/2019 | Yoakim et al. | |
| 10,859,072 B2* | 12/2020 | Beavis | B67D 1/0036 |
| 11,523,706 B2* | 12/2022 | Crozier | A47J 31/58 |
| 2007/0203587 A1* | 8/2007 | Erlandsson | A47J 31/3676 |
| | | | 700/11 |
| 2013/0263745 A1* | 10/2013 | Bombeck | A47J 31/24 |
| | | | 99/293 |
| 2014/0114469 A1* | 4/2014 | Givens | B67D 1/0041 |
| | | | 222/23 |
| 2015/0187160 A1* | 7/2015 | Anning | G07F 9/026 |
| | | | 700/231 |
| 2015/0217985 A1* | 8/2015 | Raley | B67D 1/0888 |
| | | | 700/237 |
| 2016/0296066 A1* | 10/2016 | Ognibene | A47J 31/56 |
| 2016/0376140 A1* | 12/2016 | Tansey, Jr. | A47J 31/44 |
| | | | 700/236 |

FOREIGN PATENT DOCUMENTS

| | | |
|---|---|---|
| EP | 3078306 | 10/2016 |
| WO | 2014095985 | 6/2014 |

\* cited by examiner

BEVERAGE PREPARATION DEVICE FOR VEHICLE

CROSS REFERENCE TO RELATED APPLICATIONS

The present application is a National Stage of International Application No. PCT/EP2018/058967, filed on Apr. 9, 2018, which claims priority to European Patent Application No. 17165966.7, filed on Apr. 11, 2017, the entire contents of which are being incorporated herein by reference.

FIELD OF THE INVENTION

The invention relates to the field of beverage preparation in a beverage preparation device using capsules containing ingredients. More particularly, the invention relates to a device for use in vehicles. The invention also relates to a vehicle comprising the beverage preparation device and a method for preparing a beverage from the beverage preparation device.

BACKGROUND OF THE INVENTION

The beverage preparation devices using capsules containing beverage ingredients such as ground coffee are very popular for their convenience, the consistent quality and quick preparation.

Certain beverage devices have been developed more specifically for being installed in a low voltage vehicle such as the one described in EP1277428B1. The device is an espresso coffee machine designed for a vehicle using a low power source, comprising a reservoir for the water which is connected to a pump to convey the water to a heating element, which itself is connected to an extraction head for a portion of coffee, a mobile fastener for the said head with a means which makes it possible to displace the said fastener from a position of opening to a position of closure and vice versa.

WO2014086915A1 relates to a beverage preparation device comprising a brewing unit for receiving the capsule and preparing the beverage from the ingredients by injecting liquid into the capsule, a receptacle support means, beverage delivery means and injection means adapted to selectively open a portion of the outlet wall of the receptacle (e.g., bottom of the receptacle) and to establish fluid communication between the beverage delivery means and the receptacle. The advantage is that beverage can be filled from the bottom of the receptacle thereby avoiding beverage spilling on the surface of the device or vehicle.

However, there is a need for a beverage device that can be used in vehicles while providing enough safety, when the usage of the beverage device is not conformed to the road traffic regulations and/or when the usage is prone to create distraction of the driver that could lead to accidents. For example, it may be inappropriate or dangerous to allow the usage of the beverage device while the vehicle moves or is parked on a steep slope. The present invention provides a simple solution to these problems.

SUMMARY OF THE INVENTION

The invention relates to a device for preparing a beverage, more particularly, for a vehicle comprising:
a brewing unit for receiving a dose of beverage ingredients,
a pressure pump for supplying pressurized liquid to the brewing unit,
an electronic control unit for selectively controlling the activation of the pressure pump,
wherein the electronic control unit is arranged to control the activation and de-activation of the pressure pump, by providing output to the pressure pump as response to input indicative of a determined inclination angle relative to horizontal and/or to a detected spatial displacement or acceleration; said input being received from inclination angle and/or displacement sensing means which are part and/or foreign to the device.

By "spatial displacement" or "acceleration", it is meant a displacement or an acceleration that is measured independently from pure gravity.

Therefore, the pressure pump of the beverage device can be controlled by the electronic control unit of the device as response to a spatial displacement or acceleration and/or an inclination relative to horizontal of the device itself or of the vehicle in which the device is embarked or eventually of a portable computer in short-range communication with the device and also embarked in the vehicle. Therefore, it is possible for the device to control the activation of the pump such as to stop or resume the liquid flow depending on such information. Therefore, it is possible to adapt the usage of the device to certain conditions such as conditions related to safety, road traffic or particular regulations for instance.

Preferably, the electronic control unit is arranged for stopping the pressure pump upon receiving an input from the sensing means indicative of a spatial displacement or acceleration of the device and/or an input indicative of an inclination angle, at or above a predetermined set point. Therefore, it is possible for the device to stop the preparation of the beverage device when the vehicle starts moving and/or is too inclined.

For example, such input can be indicative of an inclination angle and a predetermined set point can be a value of inclination angle of 25 degrees, preferably 30 degrees. Such set point of inclination angle may also be set in function of other parameters which may be sensed and received by the electronic control unit such as the size of the receptacle and/or the volume of liquid supplied to the brewing unit by the pressure pump.

Preferably, the electronic control unit is arranged for resuming the activation of the pressure pump at least once when receiving a second input indicative of a spatial displacement or acceleration delayed from the first input indicative of a spatial displacement or acceleration at or below a predetermined time set point. Such second input may indicate that the device is no longer displaced or accelerated. Such indication may be indirect in that it can be associated to a spatial displacement or acceleration of the vehicle and/or a portable computer such as a smart phone for example. The electronic control unit may further be arranged for maintaining the pressure pump inactivated (i. e. not resuming the activation of the pressure pump), when receiving said second input indicative of a spatial displacement or acceleration delayed from said first input, if a time condition is not met, for example, if a time set point has already been reached or exceeded, such as for example, if a too long time has elapsed between the first and second inputs. This may be particularly advantageous to prevent the preparation of a beverage which has had time to cool down during the pause. For example, the time set point for maintaining the pressure pump inactivated can be 120 or 180 seconds.

In other words, the beverage preparation can be continued after a pause of the pump when the duration for such pause is not too long or after several pauses when the total duration of the pauses has not exceeded a given time limit. The time of the pause can be controlled by the electronic control unit for resuming the liquid flow to the brewing unit while the beverage already dispensed in the receptacle has not had time to cool down and/or the head of foam has not vanished. The number of pauses can also be determined by the control unit.

The device may comprise inclination angle and/or displacement sensing means selected amongst the list of: an accelerometer, a gyro-meter, gyroscope, an inclinometer, a GPS, an optical inclination measuring device and combinations thereof. The use of an accelerometer is preferred for cost and performance reasons. The accelerometer can be, for instance, a piezoelectric, piezo-resistive or a capacitive component which is commonly used to convert the mechanical motion into an electrical signal. It may be a small micro electro-mechanical system (MEMS).

In a possible mode, the electronic control unit of the beverage preparation device is connected to the controller area network (CAN) of the vehicle in a manner to receive input from the inclination angle and/or displacement sensing means belonging to a different node of the controller area network. In other words, the input received by the electronic control unit is obtained directly from the CAN bus of the vehicle.

The invention may further envisage that the electronic control unit is arranged for correcting the liquid volume to be supplied by the pressure pump per each beverage before activating the pressure pump as function of the inclination angle relative to horizontal determined from the sensing means. Therefore, the beverage device can be controlled to fill the correct amount of beverage into the receptacle without risk of overflow.

In a possible aspect, the device further comprises a receptacle identification means providing input to the electronic control unit as to a type of receptacle positioned in proximity of the device or connected to a beverage injector of the device. The electronic control unit may thereby be arranged for further correcting the liquid volume to be supplied by the pressure pump per each prepared beverage before stopping the pump as function of the identified receptacle by the identification means. By enabling the identification of the receptacle, the electronic control unit can further define the amount of liquid to be supplied to the brewing unit. In particular, the receptacle identification may provide to the electronic control unit an indication of the filling volume of the receptacle which is correlated to the measured angle of inclination and computed to determine the corrected liquid volume for the selected beverage.

The receptacle identification means may comprise at least one or a combination of magnetic, inductive, optical, opto-electronic, radio-frequency, mechanical, electro-mechanical, electro-magnetic, or electrical reader and the receptacle comprise at least one or a combination of complementary identifying means of magnetic, inductive, optical, radio-frequency, electro-mechanical, electro-magnetic, mechanical, or electrical type readable by the reader.

In a preferred mode, the device comprises at least one receptacle and the receptacle identification means comprises at least one Hall sensor. The Hall sensor may be arranged for sensing the polarity of identifying means comprising at least one magnet radially positioned in the receptacle. The polarity may be different from one receptacle to another. Therefore, it is possible to identify at least two receptacles of different physical configurations, e.g., receptacles of two different sizes or different beverage filling volumes. Preferably, the receptacle comprises identifying means formed by a series of 2×n (two times n) magnets with alternate polarity axially positioned in the bottom of the receptacle arranged for magnetic engagement with a series of 2×n (two times n) magnets with alternate polarity axially positioned in the support for the receptacle of the device; and the receptacle further comprising a series of n magnets radially oriented and circumferentially distributed for being sensed by the Hall sensor when the receptacle is connected to the support in any of the n possible engagement positions. The number "n" represent a natural number preferably from 1 to 6, for example n may equal 3.

The electronic control unit may be arranged for controlling the activation of the pressure pump only if an input from the receptacle identification means is received confirming the detection of presence or the identification of a beverage receptacle.

The electronic control unit may be arranged for controlling the activation of the pressure pump only if an input related to the insertion of the dose of beverage ingredients in the brewing unit is received. The control of the insertion of the dose in the brewing unit may be achieved by different ways. In a preferred mode, the control of the insertion of the dose, e.g., a beverage capsule, is achieved by measuring an electrical value of a motorization unit indicative of the closing of the brewing unit when a dose is inserted therein by the motorization unit and for providing input thereof to the control unit. In a variant of the dose insertion control, the dose can be identified by dose identification means arranged for identifying the dose when such is inserted in the brewing unit and for providing input thereof to the control unit.

The invention may further relates to a vehicle comprising a device as aforementioned. More particularly, the vehicle comprises at least one inclination angle and/or displacement sensing means. The electronic control unit of the beverage preparation device can be connected as a node to the controller area network (CAN) of the vehicle in a manner to receive input from the inclination angle and/or displacement sensing means belonging to a different node of the controller area network of the vehicle. The inclination angle and/or displacement sensing means of the vehicle may be selected amongst the group of: an accelerometer, a gyro-meter, gyroscope, an inclinometer, a GPS, an optical inclination measuring device, a speed measuring device and combinations thereof. The invention further relates to a method for preparing a beverage, more particularly, from a beverage preparation device comprising a brewing unit for receiving a dose of beverage ingredients, a pressure pump and an electronic control unit for selectively controlling the activation of the pump, more particularly for a vehicle wherein it comprises:

providing, by inclination angle and/or displacement sensing means, input to the device to the electronic control unit indicative of an inclination angle and/or indicative of a spatial displacement or acceleration and, controlling the activation and de-activation of the pressure pump, by the electronic control unit providing output, as response to said inclination angle relative to horizontal and/or detected spatial displacement or acceleration.

According to the method, the electronic control unit of the beverage preparation device stops the pressure pump upon receiving input from the inclination angle and/or displacement sensing means indicative of a displacement and/or indicative of an inclination angle at or above a predetermined set point.

Preferably, the inclination and/or displacement sensing means are arranged for providing input to the electronic control unit indicative of an inclination angle and/or indicative of a spatial displacement or acceleration of the beverage preparation device or of a vehicle transporting the device or an electronic portable computer device communicating at short distance with the beverage preparation device.

Still according to the method, the electronic control unit resumes the activation of the pressure pump at least once when receiving a second input indicative of an inclination angle and/or indicative of a spatial displacement or acceleration delayed from a first input at or below a predetermined time set point and indicating that the device or vehicle or an electronic portable computer device communicating at short distance with the beverage preparation device is no longer spatially displaced or accelerated.

The method may advantageously further comprise providing input to the electronic control unit by receptacle identification means as to a type of receptacle positioned in proximity or connected to a beverage injector of the device.

The electronic control unit may be arranged for further correcting the liquid volume to be supplied by the pressure pump per each prepared beverage before stopping the pump as function of the identified receptacle.

The electronic control unit may also be arranged for controlling the activation of the pressure pump only if an input from the receptacle identification means is received confirming the detection of presence or identification of a receptacle. The electronic control unit may also be arranged for controlling the activation of the pressure pump only if an input related to the insertion of the dose of beverage ingredients in the brewing unit is received.

DETAILED DESCRIPTION OF THE DRAWINGS

Figure 1:
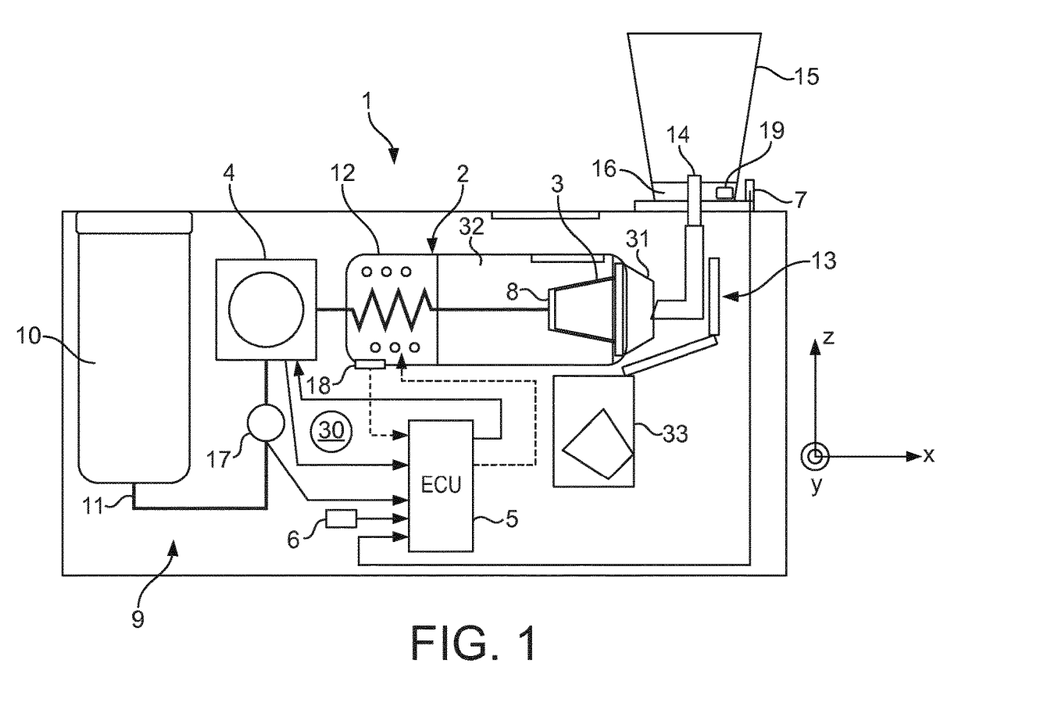
FIG. 1 shows a schematic representation of the device of the invention.

A first example of the beverage preparation device is illustrated in FIG. 1. The device may comprise a brewing unit 2 which is adapted to receive a dose 3 of beverage ingredients. The dose may be a capsule or pod or any other suitable prepacked or refilled container. The dose may be a single-serve for one beverage or multi-serve for more than one beverage. The dose may contain beverage ingredients, for example, selected from the list consisting of: roast and ground coffee, soluble coffee, milk powder, cocoa powder, soluble tea, leaf tea, fruit-based or vegetable-based concentrate and combinations thereof.

The dose is generally receivable in a brewing chamber 8 of the brewing unit 2 that may open and close about the dose 3 and form a liquid-tight engagement for ensuring that liquid injected in the chamber traverses the dose without involuntarily bypassing the dose.

The beverage device 1 comprises a pressure pump 4 arranged in the fluid circuit 9 of the device to supply liquid to the brewing unit 2, more particularly to its brewing chamber. The pressure pump 4 can be any suitable pump such as a piston pump, a gear pump, a syringe pump or a diaphragm pump.

Liquid is supplied to the pump from a liquid supply such as a water tank 10. The water tank is preferably removably connectable to a first end 11 of the fluid circuit. The first end may comprise a closure valve (not illustrated) to provide a closure when the water tank is removed for being refilled.

Liquid can be heated in the beverage device by at least one liquid heater 12. The liquid heater is arranged to heat liquid supplied under pressure by the pressure pump before it enters the brewing chamber 8. The liquid heater can be part of the brewing unit 2 or be a separated part thereof.

Beverage is prepared in the brewing chamber 8 by interaction of the beverage ingredients and supplied liquid in controlled amount, preferably water. The beverage is brewed in the chamber, e.g. by mixing liquid with the content of the dose, and leaves the brewing unit 2 through beverage dispensing means 13. The beverage dispenser may comprise a beverage injector 14 which is arranged for dispensing the beverage to a receptacle 15 (a cup and the like). Preferably, the beverage injector 14 and receptacle 15 are complementarily configured to enable the dispensing of the beverage through the bottom 16 of the receptacle. For example, the bottom of the receptacle 16 may comprise a valve (not represented) to allow beverage to enter in the receptacle while avoiding dripping or spillage when the receptacle is removed from the beverage preparation device. The beverage injector may also comprise a valve to avoid spillage when the receptacle is removed during and/or after beverage dispensing.

The control of the beverage preparation device is obtained by an electronic control unit (ECU) 5 that received input from components of the device and provides output to components of the device. In particular, a flow metering means such as a flow meter 17 can be provided in the fluid circuit to provide information indicative of the flow rate and/or volume of liquid supplied to the brewing unit by the pressure pump. The flow and/or pressure of the liquid in the fluid circuit may additionally or alternatively be determined by information provided by the pressure pump 4 to the control unit. For example, the absorbed current of the pump can be provided to the electronic control unit by the pressure pump.

At least one temperature sensor 18 may also be provided to provide information indicative of the temperature of the liquid heated by the heater. The temperature sensor 18 may be provided on the surface of the heater between the heater and the brewing chamber 8.

The device may further comprise a motorization unit 30 for controlling the opening and closing of the brewing unit 2 to enable the insertion of the dose of ingredients therein. For example, the outlet part 31 and the liquid injection part 32 of the brewing unit may be moved relative to each other between an open (dose insertion) position and a closed (brewing) position by the motorization unit 30. The motorization unit 30 may comprise a low power electrical motor and a transmission. A possible example of a brewing unit comprising an adequate motorized unit is such as described in WO2012/025259. The two parts 31, 32 are generally moved away relative to each other, e.g. linearly, into the opening position to form a passage for inserting the dose in the brewing unit and for removing the dose from the brewing unit after brewing. The dose may be removed by gravity fall into a collecting reservoir 33.

The motorization unit 30 provides input to the control unit 5 as to an electrical value indicative of the closing of the brewing unit with a dose inserted therein. The electrical value may be the electrical current absorbed by the electrical motor or a change of voltage at the closing state of the brewing unit.

According to an important aspect of the invention, inclination angle and/or displacement sensing means 6 are provided in the device to provide input to the electronic control unit as to the inclination relative to horizontal of at least one part of the device and/or the displacement or acceleration of the device relative to Earth.

The inclination angle and/or spatial displacement sensing means may be (at least) a three-axis accelerometer or a gyro-sensor or gyroscope or an inclinometer or a GPS (Global Positioning System) or an optical inclination measuring device or combinations thereof.

Preferably, the displacement of the device relative to Earth is obtained by measuring the acceleration of the device other than gravity (which acceleration is equal to one g). Preferably, the sensor is arranged for measuring the acceleration in three dimensions (three-axis reference system of axis X, Y and Z as represented on FIG. 1). Therefore it is possible for the sensor to measure a movement of the vehicle when it is moving relative to the ground. The sensor is preferably furthermore arranged for measuring the inclination of the beverage preparation device in reference to such three-axis reference system.

Optionally, the beverage preparation device comprises a receptacle identification means 7. The receptacle identification means may be arranged to provide information indicative of a type and/or maximum beverage capacity of receptacle connected to the beverage preparation device. For this the receptacle may comprise identifying means 19 that interact with the receptacle identification means 7. An example of receptacle identification means 7 and identifying means 19 is further described in relation to FIGS. 5, 6 and 7. However, these means may be of any type such as complementary magnetic, inductive, optical (such as barcode or colours(s)), radio-frequency, mechanical, electro-mechanical, electro-magnetic, electrical type identification and identifying means, or combination of different types.

The information provided by the receptacle identification means 7 may be indicative of a particular type of receptacle. The electronic control unit may be arranged for determining the relation between the type of receptacle (e.g. $T_1, \ldots T_i$) and a maximum liquid volume (e.g., $V_1, \ldots V_i$) for a corresponding beverage ($B_1, \ldots B_i$). Furthermore, the electronic control unit is arranged for calculating a corrected liquid volume ($V_{c1}, \ldots V_{ci}$) by computing several parameters at least including the maximum liquid volume ($V_1, \ldots V_i$) and the inclination angle ($A_1, \ldots A_i$) of the receptacle as measured by the inclination angle sensor 6.

Figure 2:
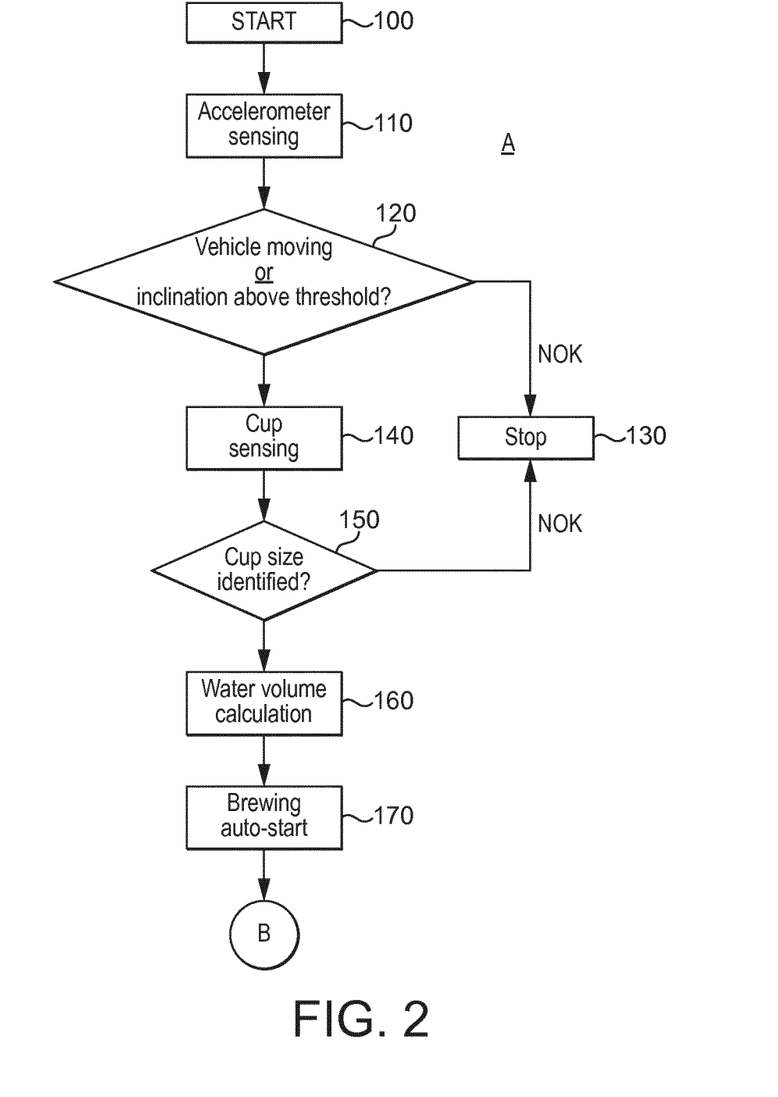
FIG. 2 is a control flow chart of the main control procedure for controlling the liquid volume before starting the preparation of a beverage in the device.

FIG. 2 illustrates a control scheme or preliminary preparation procedure A of the electronic control unit for preparing a beverage according to the beverage preparation device. The preparation may start by push-off or start event 100. Such push-off may be automatic such as triggered at least by one or a plurality of events. For example a triggering event can be the automatic identification or the detection of presence of a beverage receptacle when it is engaged with the beverage injector 14 and identified by the identifying means 19 and/or the automatic identification of the dose and/or the insertion of a dose in the brewing unit. These two events (identification of the beverage and insertion of the dose) may be required for enabling the control unit to continue the procedure of preparation for activation of the pressure pump. The control of the insertion of the dose can be achieved by the motorization unit 30 providing input to the control unit 5 as to the absorbed current measured when the brewing unit 2 closes on the dose of beverage ingredients inserted therein. For example, the preparation procedure may start after a time delay (e.g. a few seconds) following the implementation of one or a combination of these events. The preparation may also be started alternatively or cumulatively, by a start button pressed by the user.

In a second step 110, the inclination angle and/or displacement sensing means, such as an accelerometer, measure the inclination angle of the device relative to the horizontal. The angle-information is provided as input to the electronic control unit which carries out a comparison test 120 to determine if the inclination angle is at or above a set point (or threshold). For example, the angle threshold is fixed at 30 degrees (such value can possibly be modified depending on the device and/or other conditions). At or beyond such value, the electronic control unit stops the procedure and the preparation is aborted (step 130). Possibly, a preliminary test can be run to verify that the device (or vehicle in which the device is mounted) is not moving. If so, the preparation procedure is stopped as well in step 130. In the next step 140, the identification means 7 of the device attempt, for example, to identify the identifying means 19 of the receptacle. If the identification is unsuccessful in test 150, the procedure may be stopped (step 130). In step 160, if the receptacle is correctly identified, the electronic control unit determines or calculates the volume of liquid (generally water) necessary for preparing the beverage and starts automatically the brewing cycle in step 170. The preliminary preparation procedure of the beverage A is over. Of course, multiple variants may be envisaged such as additional tests or the requirement of a final decision requested to the user to start the next preparation procedure B.

Figure 3:
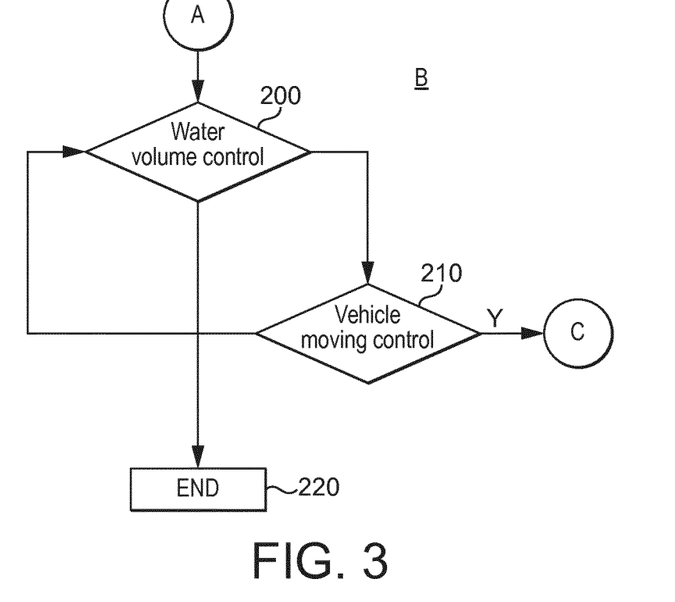
FIG. 3 is a control flow chart during preparation of the beverage.

In the next preparation procedure B, the volume of liquid is preferably repeatedly controlled in step 200 by the electronic control unit receiving input from the flow meter 17, and/or other flow measuring means, and stopping the pump and/or adjusting flow rate of the pump in response to the flow input. During the flow control procedure, a second control or test 210 may be to further check if the beverage device (or the vehicle) is moving. If no displacement by detecting an acceleration input from the accelerometer 6 is detected, the procedure continues up to the end 220. In the event an acceleration input is detected, the procedure is derived to a sub-procedure C illustrated in FIG. 4.

Figure 4:
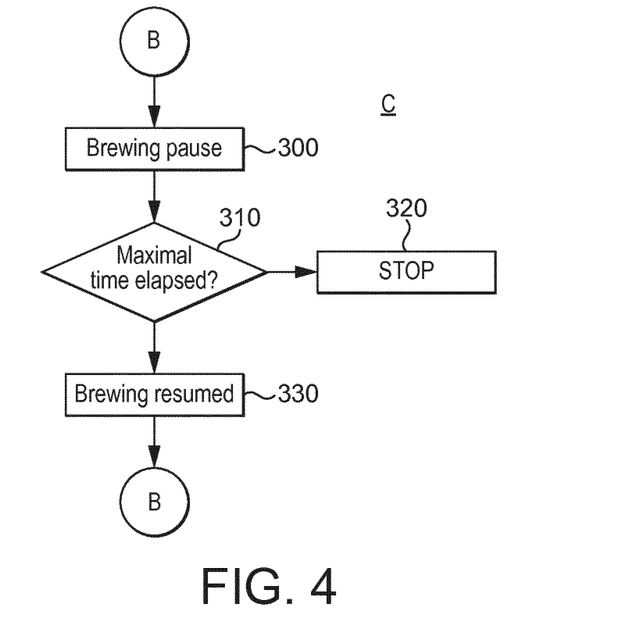
FIG. 4 is an optional control flow chart for resuming the preparation after a pause due for instance when the vehicle is momentarily parked or stopped (e.g. "traffic jam" procedure).

The sub-procedure C of preparation of the beverage may be run in loop within the procedure B until the preparation of the beverage is finished in step 220 or stopped in step 320. In this procedure, the brewing is put on hold in step 300 (i.e., pause) when the electronic control unit detects an acceleration input from the accelerometer 6. A test 310 as to whether a maximal admitted time has elapsed is carried out. This test is to ensure that the preparation cannot be run as the quality of the beverage is irremediably affected. In particular, it may be considered that a maximal elapsed time of more than 120 seconds, e.g., 180 seconds, is detrimental to the serving temperature of the beverage. In such case, the full procedure is stopped (step 320) and the preparation cannot be terminated. In the event, the pause or pauses are shorter than the elapsed time set point 310, the brewing is resumed by the electronic control unit resuming the activation of the pump in step 330. The procedure returns to procedure B until the end of the preparation or to another acceleration detection.

It should be noted that in the sub-procedure C, other parameters may be controlled that may influence the decision of the electronic control unit to interrupt the preparation. Such parameters may be, for instance, the amount of liquid volume already dispensed by the pump to the brewing unit as measured by the flow meter or the amount of liquid volume still to be dispensed. Other parameters can be a temperature input such as liquid temperature and/or ambient temperature in the vehicle.

Finally, the end of the preparation procedure in step 220 may be preceded by a last test for the presence of the receptacle by the identifying means 19 to ensure that the receptacle is correctly removed from the support and that another preparation procedure can be safely started.

FIGS. 5 to 8 illustrate a particular arrangement of a series of beverage receptacles with the beverage preparation device enabling a connection of each receptacle on the device and a proper identification of the type of receptacles by the device.

Figure 5:
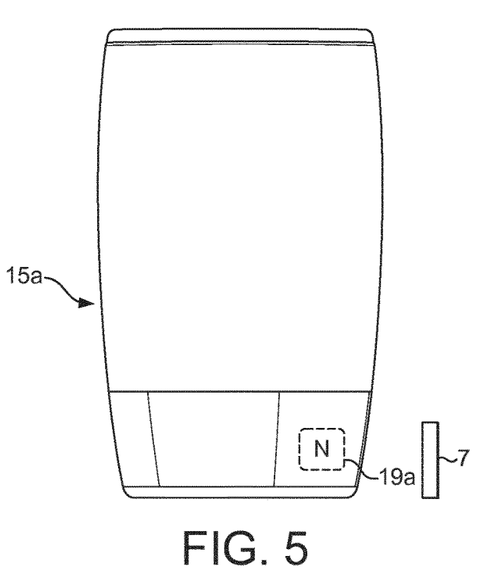
FIG. 5 shows a beverage receptacle or receptacle of large size with embedded identification means.
Figure 6:
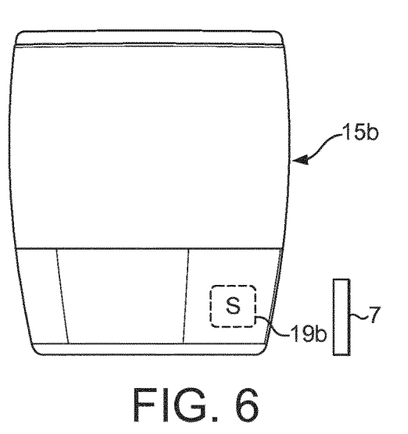
FIG. 6 shows a beverage receptacle or receptacle of small size with embedded identification means.

In FIGS. 5 and 6 are illustrated respectively long and short volume receptacles 15a, 15b with identifying means 19a, 19b when placed in correspondence with identification means 7 of the device. These identifying means 19a, 19b may, for instance, be magnetic members having two different polarities such as North (N) for the long receptacle and South (S) for the short receptacle. The identification means may be a Hall sensor or other suitable sensing means that may differentiate the polarity presented by the receptacle and therefore provide to the electronic control unit an indication as to the type of capsule present on the beverage device (such as engaged by the beverage injector 14).

Of course, other identifying means could be used such as an RFID tag, a barcode, different colours, or an electromechanical or mechanical means (e.g., selectively positioned pins and holes as described in EP1950150) that may provide additional information such as more than two types of beverage receptacles and/or beverage preparation instructions.

Figure 7:
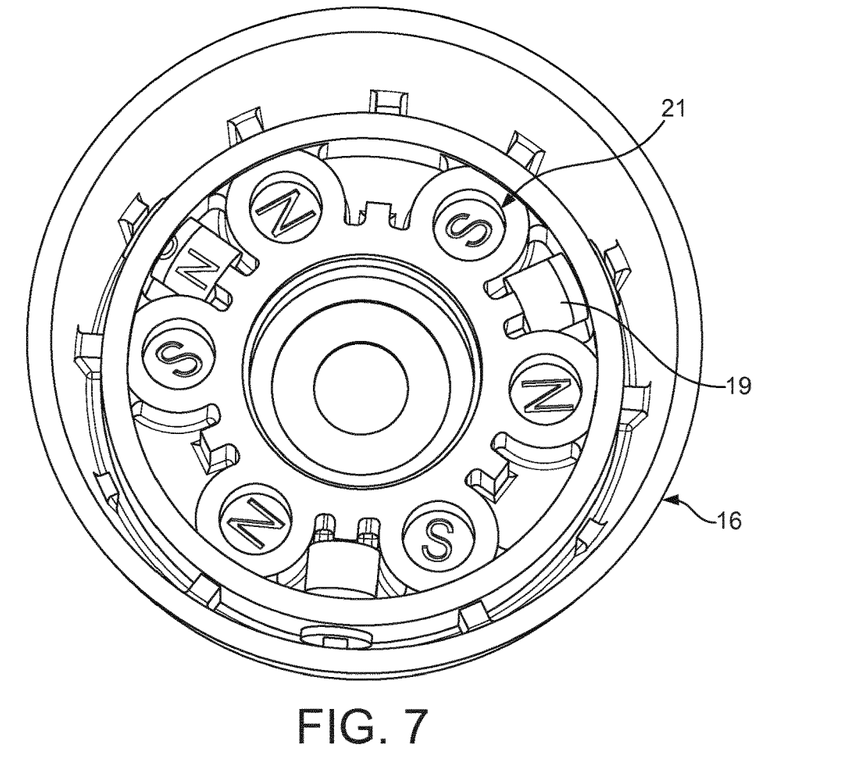
FIG. 7 shows the interior of the bottom of the receptacle provided with a magnetic connection means for securing the receptacle on the beverage device during beverage preparation and with magnetic identifying means to identify the receptacle on the beverage device before starting beverage preparation.
Figure 8:
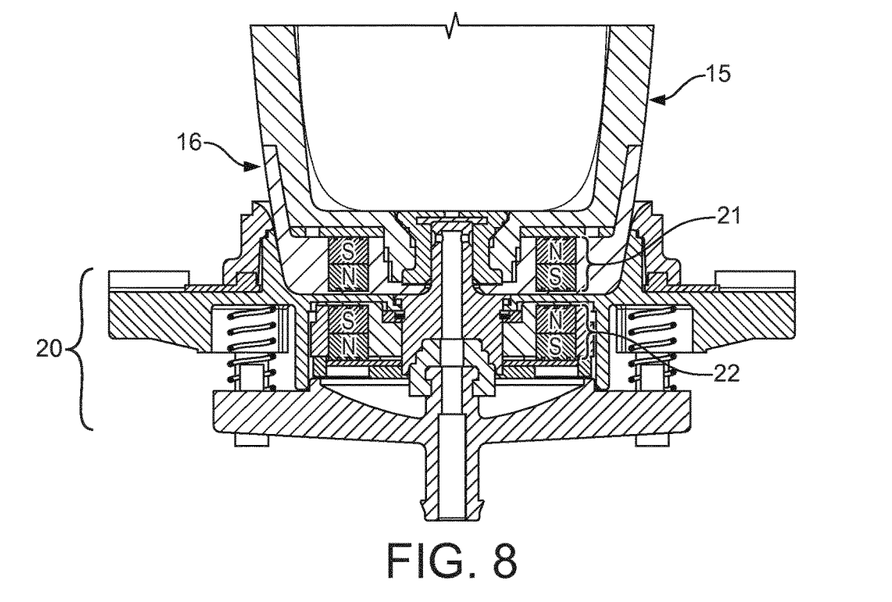
FIG. 8 shows a cross-sectional view of the receptacle and beverage device when connected together for preparation of the beverage.

FIGS. 7 and 8 show a connection assembly of the receptacles 19, 19a,19b on the support 20 of the device enabling to position the receptacle in "n" numbers of predetermined angular positions. The number "n" is a natural number equal to or above 1. In the example n equal 3.

In particular, the bottom 16 of the receptacle comprises a series of 2×n magnets 21 distributed along the periphery or circumference of the bottom in alternate polarity (N—S—N—S—N—S) and oriented axially. The magnets interact in magnetic arrangement with a series of 2×n magnets 22 positioned circumferentially inside the support 20 in alternate polarity (S—N—S—N—S—N) and oriented axially as illustrated in FIG. 8 and with the same distance between the adjacent magnets (S—N) as for the adjacent magnets (N—S) of the receptacle. As a result, when the receptacle 15 is sufficiently approached from the support, the receptacle is attracted in three possible angular positions corresponding to S—N or N—S magnetic attractions of pairs of magnets.

In FIG. 7 it is further shown that a series of "n" additional magnets 19 are provided (in this example, n=3), which are all oriented radially in a selected polarity (N or S) depending on the type of receptacle 15a, 15b. Therefore, the "n" identifying magnets of the long receptacle are radially positioned with the North Pole oriented outwardly and the South Pole oriented inwardly whereas the orientation is opposite for the short receptacle.

Furthermore, the Hall sensor is positioned in correspondence with at least one predetermined position of any of such radially oriented magnets considering the "n" number of positions of the receptacle connected to the support 20. As a result, when in any of the "n", for example three, possible positions, the Hall sensor is normally always capable of identifying reliably which type of receptacle (short or long) is engaged by the injector on the support.

A single identifying magnet 19 may be used to as identifying means. In that case, "n" Hall sensors may be positioned in the device to detect the magnet which can be positioned in "n" different positions.

Such receptacle type information can then be used by the electronic control unit to determine the maximum volume of liquid to supply to the brewing unit by the pressure pump and/or correcting the liquid volume depending on the determination of the inclination angle.

Figure 9:
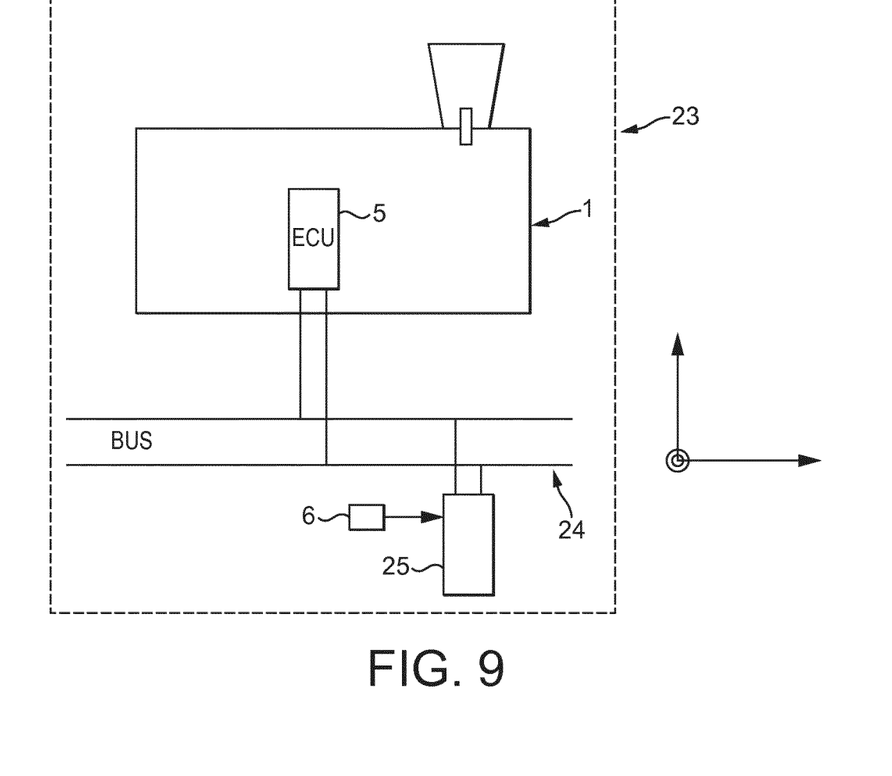
FIG. 9 shows a vehicle comprising a beverage preparation device according to a second example of the invention.

FIG. 9 illustrates a second example of the invention. In this example, the beverage preparation device is embedded in a vehicle 23 such as a car, truck, boat, plane spatial ship and the like. The vehicle comprises a controller area network (CAN) 24 or an equivalent network forming a bus to which are connected nodes which comprise, in particular, the electronic control unit 5 of the beverage preparation device and at least another electronic control unit 25 of the vehicle which comprises inclination angle and/or displacement sensing means 6. The inclination angle and/or displacement sensing means 6 is arranged to provide input to the electronic control unit 25 of the vehicle. Such input can be communicated as such or as related data to the electronic control unit 5 of the beverage preparation device via the bus. The inclination and/or displacement sensing means of the vehicle may be for instance at least one accelerometer or gyro-meter or gyroscope or inclinometer or GPS or optical inclination measuring device or speed measuring device or combinations thereof. The scheme controls may be identical to the ones described in relation to the first example. The beverage preparation device may be the same or may differ slightly from the first example in that the accelerometer can be omitted.

Figure 10:
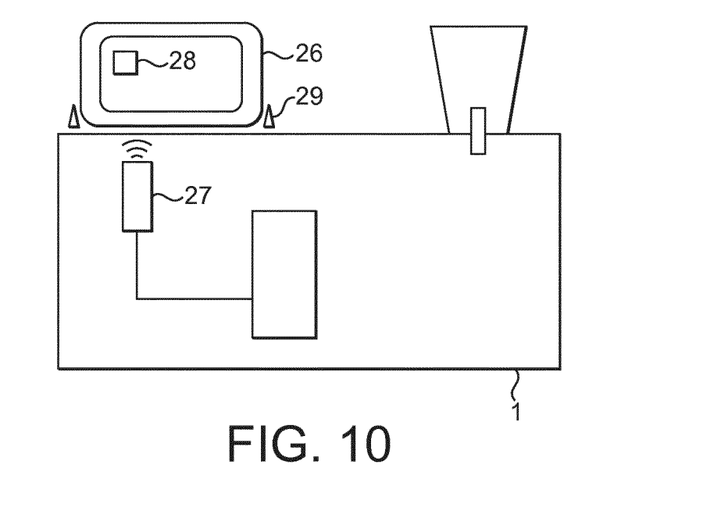
FIG. 10 shows a beverage preparation device in short-range communication with a portable computer according to a third example of the invention.

In a third example of the invention, the input indicative of a determined inclination angle relative to horizontal and/or to a detected spatial displacement or acceleration are provided by inclination angle and/or displacement sensing means which are part of a portable computer 26 such as a smart phone. The transfer of data related to the inclination and/or displacement can be wired or wireless. For example, the portable computer device comprises a communication module (such as Bluetooth module) which communicates to a communication module 27 (such as a Bluetooth module) with the beverage preparation device to enable the transfer of data related to the inclination and/or displacement of the portable device. A program 28 such as an app may be provided in the memory of the portable computer device which is arranged for controlling the preparation of the beverage preparation device. The program is arranged for receiving information from the sensing means such an accelerometer and/or GPS and for transferring such information to the electronic control unit of the beverage preparation machine. The program may comprise additional functionalities that may more finely control the activation or deactivation of the pump such as by detection and/or anticipation of road traffic. For example, the program may be arranged to interrupt or delay or anticipate the preparation of the beverage when road traffic is detected. The beverage preparation device may comprise positioning means 29 for placing the portable computer device in a determined and stable position relative to the device such as on a top wall of the beverage preparation device. The positioning means may be a recess or drawer or a removable connection such as magnets.

REFERENCE TO DRAWINGS

1. Beverage preparation device
2. Brewing unit
3. Dose of beverage ingredients
4. Pressure pump
5. Control unit
6. Accelerometer
7. Receptacle identification means
8. Brewing chamber
9. Fluid circuit
10. Water tank
11. First end
12. Water heater
13. Beverage dispensing means
14. Beverage injector
15. Receptacle (15*a*. Long; 15*b*. Short)
16. Bottom of receptacle
17. Flow meter
18. Temperature sensor
19. Identifying means (19*a*. North; 19*b*. South)
20. Support for receptacle
21. Magnets of receptacle
22. Magnets of support
23. Vehicle
24. CAN
25. Electronic control unit (vehicle)
26. Portable computer device
27. Communication module
28. App for preparation of the beverage
29. Positioning means
30. Motorization unit
31. Outlet part
32. Liquid injection part
33. Collecting reservoir

The invention claimed is:

1. A device for preparing a beverage for a vehicle, the device comprising:
   a brewing unit configured for receiving a dose of beverage ingredients;
   a pressure pump configured for supplying pressurized liquid to the brewing unit;
   an electronic control unit configured for selectively controlling activation of the pressure pump; and
   the electronic control unit is configured to control the activation and de-activation of the pressure pump by providing output to the pressure pump in response to input indicative of a determined inclination angle relative to horizontal and/or a detected spatial displacement or acceleration, the input being received from an inclination angle sensor and/or a displacement sensor which is part of and/or foreign to the device;
   wherein the device further comprises a receptacle identification member configured to provide receptacle input to the electronic control unit, the receptacle input including a type of receptacle positioned in proximity or connected to a beverage injector of the device;
   wherein the receptacle identification member comprises at least one component selected from the group consisting of a magnetic, inductive, optical, opto-electronic, radio-frequency, mechanical, and electrical reader;
   wherein the device further comprises at least one receptacle, and the receptacle identification member comprises at least one Hall sensor for sensing the polarity of the receptacle identification member, the at least one Hall sensor comprising at least one magnet radially positioned in the at least one receptacle, the polarity being different from one receptacle to another.

2. The device according to claim 1, wherein the electronic control unit is configured to stop the pressure pump upon receiving the input indicative of the detected spatial displacement or acceleration and/or the determined inclination angle, the input being at or above a predetermined set point.

3. The device according to claim 2, wherein the electronic control unit is configured to resume the activation of the pressure pump at least once when receiving a second input indicative of a spatial displacement or acceleration which is delayed from a first input indicative of spatial displacement or acceleration at or below a predetermined time set point and directly or indirectly indicating that the device is no longer displaced or accelerated.

4. The device according to claim 1, wherein the inclination angle sensor and/or the displacement sensor is selected from the list consisting of: a three-axis accelerometer, a gyro-sensor, a gyroscope, an inclinometer, a GPS, an optical inclination measuring device, and combinations thereof.

5. The device according to claim 1, wherein the electronic control unit is configured to correct a volume of the pressurized liquid to be supplied by the pressure pump for each beverage before activating the pressure pump as a function of the determined inclination angle relative to horizontal determined from the inclination angle sensor.

6. The device according to claim 1, wherein the electronic control unit is configured to further correct the volume of the pressurized liquid to be supplied by the pressure pump for each prepared beverage before stopping the pump as a function of the type of receptacle.

7. The device according to claim 1, wherein the electronic control unit is configured to control the activation of the pressure pump only if the receptacle input from the receptacle identification member confirms the presence or identification of a beverage receptacle.

8. The device according to claim 1, wherein the electronic control unit is configured to control the activation of the pressure pump only if an input related to an insertion of the dose of beverage ingredients in the brewing unit is received.

9. The device according to claim 1, the inclination angle sensor indicating the determined inclination angle relative to horizontal of the vehicle in which the device is provided.

10. A vehicle comprising:
    a device configured for preparing a beverage, the device comprising:
    a brewing unit configured for receiving a dose of beverage ingredients,
    a pressure pump configured for supplying pressurized liquid to the brewing unit, an electronic control unit configured for selectively controlling activation of the pressure pump, and the electronic control unit configured to control the activation and de-activation of the pressure pump by providing output to the pressure pump in response to input indicative of a determined inclination angle relative to horizontal and/or a detected spatial displacement or acceleration, the input being received from an inclination angle sensor and/or a displacement sensor which are part of and/or foreign to the device;

wherein the electronic control unit of the device is connected as a node to a controller area network of the vehicle in a manner to receive input from the inclination angle sensor and/or the displacement sensor belonging to a different node of the controller area network, wherein the device further comprises a receptacle identification member configured to provide receptacle input to the electronic control unit, the receptacle input including a type of receptacle positioned in proximity or connected to a beverage injector of the device;

wherein the receptacle identification member comprises at least one component selected from the group consisting of a magnetic, inductive, optical, opto-electronic, radio-frequency, mechanical, and electrical reader; and wherein the device further comprises at least one receptacle, and the receptacle identification member comprises at least one Hall sensor for sensing the polarity of the receptacle identification member, the at least one Hall sensor comprising at least one magnet radially positioned in the at least one receptacle, the polarity being different from one receptacle to another.

11. A method for preparing a beverage from a beverage preparation device, the beverage preparation device comprising a brewing unit configured for receiving a dose of beverage ingredients, a pressure pump, and an electronic control unit configured for selectively controlling activation of the pressure pump and for a vehicle, wherein the method comprises:

providing, by an inclination angle sensor and/or a displacement sensor, input to the electronic control unit indicative of an inclination angle and/or a spatial displacement or acceleration; and controlling, by the electronic control unit, the activation and de-activation of the pressure pump by the electronic control unit providing output in response to an inclination angle relative to horizontal and/or a detected spatial displacement or acceleration, wherein the beverage preparation device further comprises a receptacle identification member configured to provide receptacle input to the electronic control unit, the receptacle input including a type of receptacle positioned in proximity or connected to a beverage injector of the beverage preparation device;

wherein the receptacle identification member comprises at least one component selected from the group consisting of a magnetic, inductive, optical, opto-electronic, radio-frequency, mechanical, and electrical reader;

wherein the beverage preparation device further comprises at least one receptacle, and the receptacle identification member comprises at least one Hall sensor for sensing the polarity of the receptacle identification member, the at least one Hall sensor comprising at least one magnet radially positioned in the at least one receptacle, the polarity being different from one receptacle to another.

12. The method according to claim 11, wherein the inclination angle sensor and/or the displacement sensor is configured to provide input to the electronic control unit indicative of an inclination angle and/or a spatial displacement or acceleration of the beverage preparation device, a vehicle transporting the beverage preparation device, or an electronic portable computer device communicating at a short distance with the beverage preparation device.

13. The method according to claim 11, wherein the electronic control unit of the beverage preparation device stops the pressure pump upon receiving input from the inclination angle sensor and/or the displacement sensor indicative of a displacement and/or an inclination angle at or above a predetermined set point.

14. The method according to claim 13, wherein the electronic control unit of the beverage preparation device resumes the activation of the pressure pump at least once when receiving a second input indicative of an inclination angle and/or a spatial displacement or acceleration delayed from a first input at or below a predetermined time set point and indicating that one of the beverage preparation device, the vehicle, or an electronic portable computer device communicating at a short distance with the beverage preparation device is no longer spatially displaced or accelerated.

15. The method according to claim 11, comprising providing input to the electronic control unit by a receptacle identification member as to a type of receptacle positioned in proximity or connected to a beverage injector of the beverage preparation device.

* * * * *